United States Patent [19]

Grove

[11] Patent Number: 5,007,446

[45] Date of Patent: Apr. 16, 1991

[54] TEMPERATURE ACTUATED FLOW CONTROL DEVICE

[75] Inventor: Lee A. Grove, Elkhart, Ind.

[73] Assignee: Remote Controls, Inc., Mishawaka, Ind.

[21] Appl. No.: 532,064

[22] Filed: Jun. 1, 1990

Related U.S. Application Data

[63] Continuation-in-part of Ser. No. 427,255, Oct. 25, 1989, Pat. No. 4,947,886, Continuation-in-part of Ser. No. 341,474, Apr. 21, 1989, Pat. No. 4,884,595.

[51] Int. Cl.$^5$ .................. F16K 11/18; F16K 31/64; F16L 55/14
[52] U.S. Cl. .................................. 137/72; 137/80; 137/636.1; 251/5; 251/9; 251/263; 251/334
[58] Field of Search ................ 137/72, 75, 79, 80, 137/636, 636.1; 251/5, 6, 9, 121, 122, 332, 334, 360, 364, 251, 263, 66, 67, 14; 604/250

[56] References Cited

U.S. PATENT DOCUMENTS

| | | | |
|---|---|---|---|
| 114,981 | 5/1871 | Shoenberger | 251/4 |
| 2,640,491 | 6/1953 | MacBain | 137/75 |
| 2,732,859 | 1/1956 | Chace | 251/122 |
| 2,917,271 | 12/1959 | Banks | 251/122 |
| 3,016,915 | 1/1962 | Moeller, Jr. | 137/636.1 |
| 3,075,551 | 1/1963 | Smith | 251/7 |
| 3,108,434 | 10/1963 | Morley et al. | 137/72 |
| 3,223,116 | 12/1965 | Criddle | 251/5 |
| 3,598,145 | 8/1971 | Wolfson | 251/360 |
| 3,998,241 | 12/1976 | Jones et al. | 137/636.1 |
| 4,060,351 | 11/1977 | Cloup | 251/332 |

FOREIGN PATENT DOCUMENTS 1257738 2/1961 France .................. 137/636.1

Primary Examiner—George L. Walton
Attorney, Agent, or Firm—Barnes & Thornburg

[57] ABSTRACT

A flow control device, such as a valve, has a valve body which has a fluid holding chamber therein. An inlet in the valve body couples the chamber to a source of pressurized fluid. An outlet in the valve body couples the chamber to downstream devices such as sprinkler heads. The outlet has an outlet opening which opens to the valve chamber. A collapsible tubing is sealingly attached at a first end to the outlet opening. The collapsible tubing has an opposite end which extends into the chamber. The opposite end of the collapsible tubing has an inlet which opens into the chamber. A mechanism is provided for blocking and unblocking the inlet of the opposite end of the collapsible tubing to cause the collapsible tubing to collapse and uncollapse to block and unblock fluid flow from the chamber through the outlet. The mechanism has a piston for insertion into and withdrawal from the inlet of the collapsible tubing to block and unblock the inlet. When the piston is inserted into the inlet of the collapsible tubing, the collapsible tubing collapses around the piston to block fluid flow from the chamber through the outlet. However, the collapsible tubing is not "pinched shut" and thus does not take on a set "pinched shut" shape. Thus, when the piston is withdrawn from the inlet, the collapsible tubing uncollapses immediately permitting fluid to flow without delay from the chamber through the outlet.

31 Claims, 7 Drawing Sheets

TEMPERATURE ACTUATED FLOW CONTROL DEVICE

BACKGROUND AND SUMMARY OF THE INVENTION

This is a continuation-in-part of U.S. Ser. No. 427,255 for a Flow Control Device filed Oct. 25, 1989, now U.S. Pat. No. 4,947,886, which is a continuation-in-part of U.S. Ser. No. 341,474, now U.S. Pat. No. 4,884,595 for a Flow Control Device filed Apr. 21, 1989 and issued Dec. 5, 1989.

The present invention relates generally to flow control devices, and more particularly to devices, such as valves, which are well-suited for controlling the flow of liquids, gases, slurries, suspensions, mixtures and other fluid or fluidized streams, collectively referred to below as "fluids" or "media." Devices constructed in accordance with the present invention are especially well-suited for controlling the flow of a fluid or medium which is contaminated with, or which includes by design, sand, sediments, and/or other solid particulate matter having abrasive properties.

A variety of valves suitable for controlling the flow of liquid and gaseous fluids are available. Such valves typically incorporate sealing surfaces or elements which may include diaphragms, O-rings, pistons, disks or specially machined tapered seats. The ability of such devices to function properly when exposed to sediment, sand, dirt, metal chips or other particles in the fluid flow varies with specific design parameters and operating conditions, but in general is not good. Such contaminants tend to clog, score, or otherwise damage sealing surfaces in the valves, leading to degradations in performance, or outright failures, of the valves.

One particular application for valves in which the above problems have been identified relates to large, ocean going vessels, and particularly to naval warships. Warships are typically provided with sprinkler systems which are intended to dowse fires in or around the ship's magazine, fuel supply, and other installations. Such ships may also be provided with wash-down systems which are used in decontaminating surfaces which have been exposed to chemical clouds, radioactive fallout, or other hazards. Water to supply such systems is generally drawn from the sea through one or more large water inlets located below the water line of the ship. Sea water may also be drawn in through these or other inlets to provide water for use in maintenance, cooling and other applications where clean, fresh water is not required. Although these inlets may be provided with strainers to keep out seaweed and other large objects, sand, sediments, and other smaller contaminants are often drawn into these systems. This is particularly true when the ship is required to sail or dock in relatively shallow waters or harbors.

Accordingly, a need exists for valves which can control the flow of media which may be contaminated with sand, sediments, or other solid particulate matter. Such a need was met by the flow control device which is the subject of U.S. Pat. No. 4,884,595.

The flow control device which is the subject of U.S. Pat. No. 4,884,595 comprises a body having side walls which define a fluid holding chamber, at least one inlet opening into the chamber, at least one outlet opening into the chamber and having an outlet opening in the valve body, collapsible tubing means sealingly attached to the outlet opening and extending into the chamber, and means for selectively collapsing and uncollapsing the tubing means to block and unblock the flow of fluid from the chamber through the outlet opening. The means for collapsing the tubing means comprises a mechanical device disposed adjacent the tubing means at a first location spaced apart from the side walls of the chamber. The fluid or media flow enters the chamber under a positive pressure. When the mechanical device collapses the tubing at the first location, the pressure of the surrounding fluid in the chamber exerts a collapsing force on that portion of an outer surface of the tubing means between the mechanical device and the side wall of the chamber, causing that portion of the tubing means to collapse. The mechanical device may comprise a camming device and an operator for the camming device, such as a handle and a shaft which extends through the side wall of the chamber. In one embodiment, the valve includes at least two outlets, each having collapsible tubing means attached thereto. In this embodiment, both tubing means are commonly collapsed by operation of a single camming device.

The mechanical device illustratively includes a pair of closure members oppositely disposed on either side of the tubing means. At least one of the members is movably mounted and situated adjacent a camming surface of the camming device. The movable members cooperate with the camming device to collapse the tubing means when the camming device is operated.

One means for uncollapsing the tubing means comprises pressure exerted by the fluid or media on an inner surface of the tubing means. When the mechanical device is moved to a position which does not collapse the tubing means at the first location, the pressure of the fluid or media in the chamber causes the tubing means to return to an uncollapsed (open) condition. The tubing means may be formed from a natural or synthetic rubber, or a functionally equivalent material, having a durometer hardness rating which is selected on the basis of at least one characteristic (such as specific gravity, viscosity, etc.) of a fluid flow controlled by the device. In one embodiment, the hardness rating is selected for the sizes and types of particulate matter expected in the fluid flow. In one application involving a sand and sediment contaminated flow of water, tubing formed of a synthetic rubber, marketed under the name VITON and having a durometer hardness rating in the range of 60–90 was found acceptable. Proper selection of the material and hardness rating assures that the tubing means will adequately surround and encapsulate particles which may be carried by particular media flows, and that an undue amount of force or pressure will not be required to collapse the tubing.

Such devices may further comprise means responsive to an increase in temperature for automatically returning the tubing means to an uncollapsed state to allow fluid to flow from the chamber through the outlet means when the temperature of the device increases beyond a predetermined value. The means responsive to an increase in temperature may incorporate a metal (or other material) having a relatively low melting point which corresponds to the selected predetermined value. In one embodiment the means for selectively collapsing the tubing means includes a movably mounted member disposed adjacent the tubing means, biasing means for urging the member against the tubing means to collapse the tubing and block the flow of fluid from the chamber, and means for selectively moving the member against the biasing means and away from the tubing means to allow the tube to return to an uncollapsed state so that fluid may flow from the chamber through the outlet means. In this embodiment, the low melting point metal forms a supporting base for the biasing means (e.g., a coil spring) such that when the temperature of the device increases beyond the predetermined value, the supporting base for the biasing means melts and the biasing means sinks into the base and ceases to urge the member against the tubing means. This allows the tubing to return to the uncollapsed state so that fluid may flow from the chamber through the associated outlet.

In another embodiment, an improved means for automatically opening the valve when it is exposed to a temperature which reaches or exceeds a predetermined temperature is provided such as is described in U.S. Ser. No. 427,255. The valve has two portions which define two valve chambers. An inlet, which is coupled to a source of pressurized fluid, opens into one of the valve chambers and an outlet coupled to downstream devices opens into the other valve chamber. A piece of collapsible tubing couples the two valve chambers. A shaft extends into the valve and is provided with a mechanism for pinching the collapsible tubing shut which causes the collapsible tubing to collapse due to the pressure exerted on its exterior by the pressurized fluid surrounding it. A coil spring is attached to the shaft and the valve body. When the valve is closed, i.e., the collapsible tubing collapsed, the coil spring is biased to cause the shaft to rotate if released. The shaft is prevented from rotating by a fusible link. When the temperature reaches or exceeds a predetermined temperature, the fusible link melts. This releases the shaft and the coil spring rotates the shaft which permits the collapsible tubing to uncollapse, thus opening the valve.

A problem with the flow control devices just described arises when the collapsible tubing is pinched shut for a long period of time such as several days or more. When this occurs, the collapsible tubing tends to take on a set shape, i.e., "pinched shut." When the member which has pinched the tubing shut to cause it to collapse is moved away from the tubing to allow it to uncollapse, the "pinched shut" set shape of the collapsible tubing causes a delayed response in the tubing uncollapsing. While this delayed response is only in the order of seconds, it is undesirable since one application for such flow control devices is the control of sprinkler systems to douse fires.

It is an object of this invention to provide an improvement to the mechanism heretofore used in the flow control devices described in U.S. Pat. No. 4,884,595 and U.S. Ser. No. 427,255 to prevent the collapsible tubing from taking on a set "pinched shut" shape.

This and other objects of the present invention are attained in a flow control device as described in U.S. Pat. No. 4,884,595 and U.S. Ser. No. 427,255, which are incorporated by reference, by an improved means for selectively collapsing and uncollapsing the collapsible tubing to block and unblock the flow of fluid from the chamber through the outlet opening. In an embodiment, this improved means comprises a piston having a tapered end. The piston is mounted within the chamber with its tapered end adjacent the inlet of the collapsible tubing. Means are provided for moving the piston toward the inlet of the collapsible tubing to insert the tapered end of the piston into the inlet of the collapsible tubing. When this occurs, fluid is blocked from entering the collapsible tubing from the chamber. The pressure in the chamber then causes the collapsible tubing to collapse around the tapered end of the piston which has been forced into the inlet of the collapsible tubing. This blocks the flow of fluid from the chamber into the collapsible tubing.

Means are provided for moving the piston away from the inlet of the collapsible tubing to uncollapse the collapsible tubing by drawing the tapered end of the piston out of the inlet of the collapsible tubing. Since the collapsible tubing collapsed around the tapered end of the piston and was not pinched together, it does not take on a set "pinched shut" shape. Consequently, as soon as the tapered end of the piston is drawn out of the inlet of the collapsible tubing, fluid will flow from the chamber through the collapsible tubing.

Other objects, advantages and novel features of the present invention will become apparent from the following detailed description of the invention when considered in conjunction with the accompanying drawings.

DETAILED DESCRIPTION OF THE DRAWINGS

Figure 1:
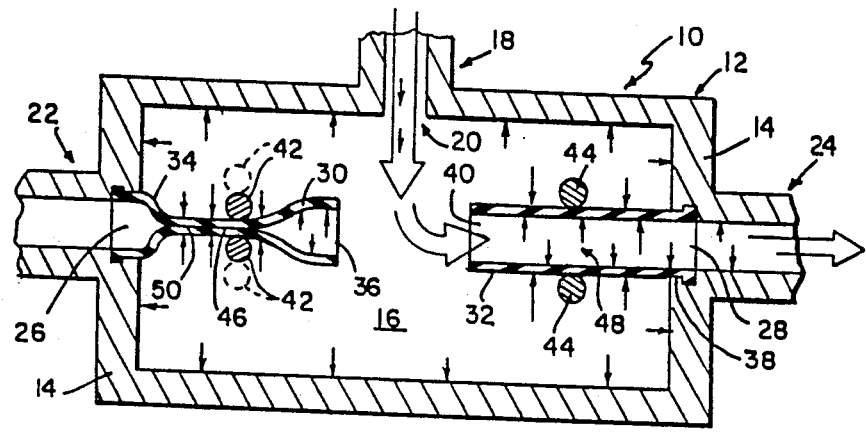
FIG. 1 shows a schematic representation of a valve constructed in accordance with the invention of U.S. Pat. No. 4,884,595.

FIG. 1 shows a schematic representation of a valve 10 constructed in accordance with the invention of U.S. Pat. 4,884,595. Valve 10 includes a valve body 12 which has side walls 14 which define a fluid holding chamber 16 which receives a flow of pressurized fluid from an inlet 18. Inlet 18 is adapted for connecting valve 10 to an upstream source of pressurized fluid (not shown) and, thus, is preferably provided with threads or other appropriate means for connecting to a nipple, union, or other appropriate hardware. Inlet 18 has a downstream end 20 which opens into chamber 16 to complete the connection between the upstream source of pressurized fluid and fluid holding chamber 16.

The embodiment of valve 10 illustrated in FIG. 1 is further provided with outlets 22 and 24 which, for purposes of illustration only, are shown on opposite sides of valve body 12. As with inlet 18, outlets 22 and 24 are provided with nipples, unions, or other appropriate hardware (not shown) to facilitate connection to a downstream device. Outlets 22 and 24 may be connected to a variety of downstream devices, including sprinkler heads, plumbing fixtures, wash-down hoses, or other manually or automatically operated valves. Valve 10 may also be used as a pilot control valve, in which case outlets 22 and 24 may be connected to the pilot or control inputs of other valves or similar devices.

Outlets 22 and 24 include respective outlet openings 26 and 28 in side walls 14. Sealingly attached or connected to these outlet openings are lengths of collapsible tubing 30 and 32. Specifically, tubing 30 is connected at its first end 34 around outlet opening 26, and extends from outlet opening 26 into chamber 16. Second end 36 of tubing 30 opens into valve chamber 16 to allow for entry of pressurized fluid. Similarly, tubing 32 has a first end 38 which is sealingly connected or attached around outlet opening 28, and extends from outlet 28 into valve chamber 16. Second end 40 of tubing 32 opens into valve chamber 16 to admit the high pressure fluid, as indicated by the open arrows in FIG. 1.

The remaining components of valve 10, as illustrated in FIG. 1, are schematically illustrated mechanical devices 42 and 44 which are disposed adjacent locations 46 and 48 of tubings 30 and 32, respectively, and which are used for collapsing tubings 30 and 32 at these locations. Tubing 30 is shown in a collapsed or closed state, while tubing 32 is shown in an uncollapsed or opened state. Mechanical devices 42 and 44 may be cam operated mechanical members (as illustrated below in connection with the embodiment shown in FIGS. 2 and 3) or, alternatively, may employ any other suitable means for collapsing the tubing at locations 46 and 48, including electrical solenoids, hydraulic and/or pneumatic operators, or other appropriate mechanical devices. Tubings 30 and 32 are formed of a relatively soft synthetic or natural rubber (or functionally equivalent material) having a durometer hardness rating selected for the sizes and types of particles expected in the fluid flow. In a particular application involving a flow of water contaminated with sand and sediments, tubing formed of the synthetic rubber VITON having a durometer rating of 60-90 was found to provide acceptable results. Proper selection of tubing type and hardness assures that the tubing is relatively easy to collapse at the specified locations.

As indicated by the closed arrows in FIG. 1, an equal pressure acts on both the inner and outer surfaces of the tubing (i.e., tubing 32) in its uncollapsed state. However, when the tubing is collapsed, for example, at location 46 by device 42, the pressure inside the tube downstream of location 46 decreases. The pressure of the fluid in chamber 16 acts on the outer surface of tubing 30 between location 46 and side wall 14 to further collapse this portion of the tube. Thus, a relatively large sealing area 50 is provided by the combined action of device 42 and the pressure of the fluid in fluid chamber 16. Since the tubing durometer rating of the tubing can be chosen to assure that the tubing is relatively soft, particles of sand, sediments, or other contaminants in sealed area 50 will be enclosed and encapsulated by the tubing, enabling the valve to completely shut off the flow, notwithstanding the presence of these particles. If necessary, a bleed valve is connected in the downstream circuit (i.e., downstream of opening 26) to assure that pressure is not trapped in the downstream circuit, and that the portion of tubing 30 between location 46 and side wall 14 will be collapsed by the fluid pressure when the pressure in the downstream circuit decreases substantially below that of the fluid in chamber 16.

It should be noted that when the tubing is in the uncollapsed condition, there is equal pressure on both the inner and outer surfaces of the tube. Consequently, regardless of the pressure that is applied to the inside of chamber 16, the force required to collapse the tubing at locations 46 and 48 remains constant. This is the same force that would be required to collapse the tubing in an unpressurized environment. Since all portions of the tube are wholly contained within valve chamber 16, and the tubing is never required to contain the pressure in the chamber, the pressure rating of the tubing is not critical.

Although the valve illustrated in FIG. 1 is shown with a single inlet 18, additional inlets may be provided, if desired. Similarly, a single outlet or three or more outlets may be provided as alternatives to the two-outlet configuration shown.

Figure 2:
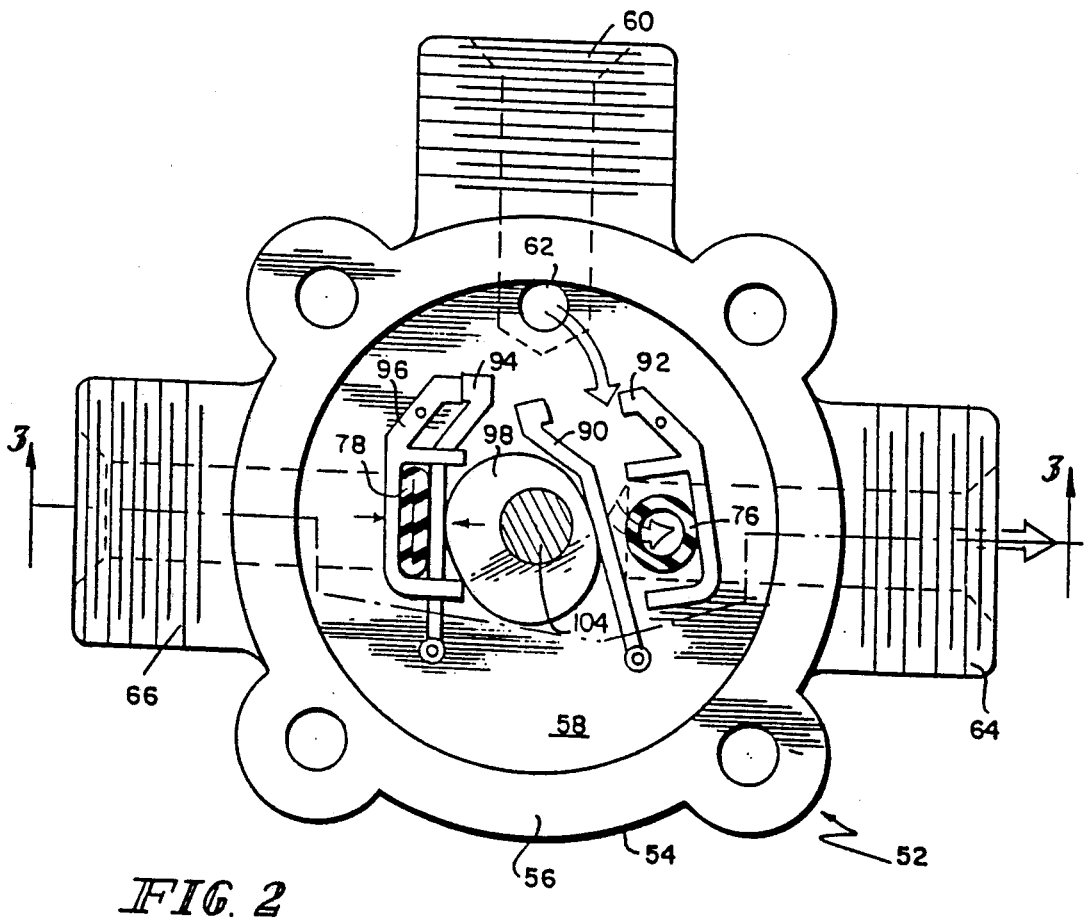
FIG. 2 shows a top view (with top cover removed) of an embodiment of a valve constructed in accordance with the invention of U.S. Pat. No. 4,884,595.
Figure 3:
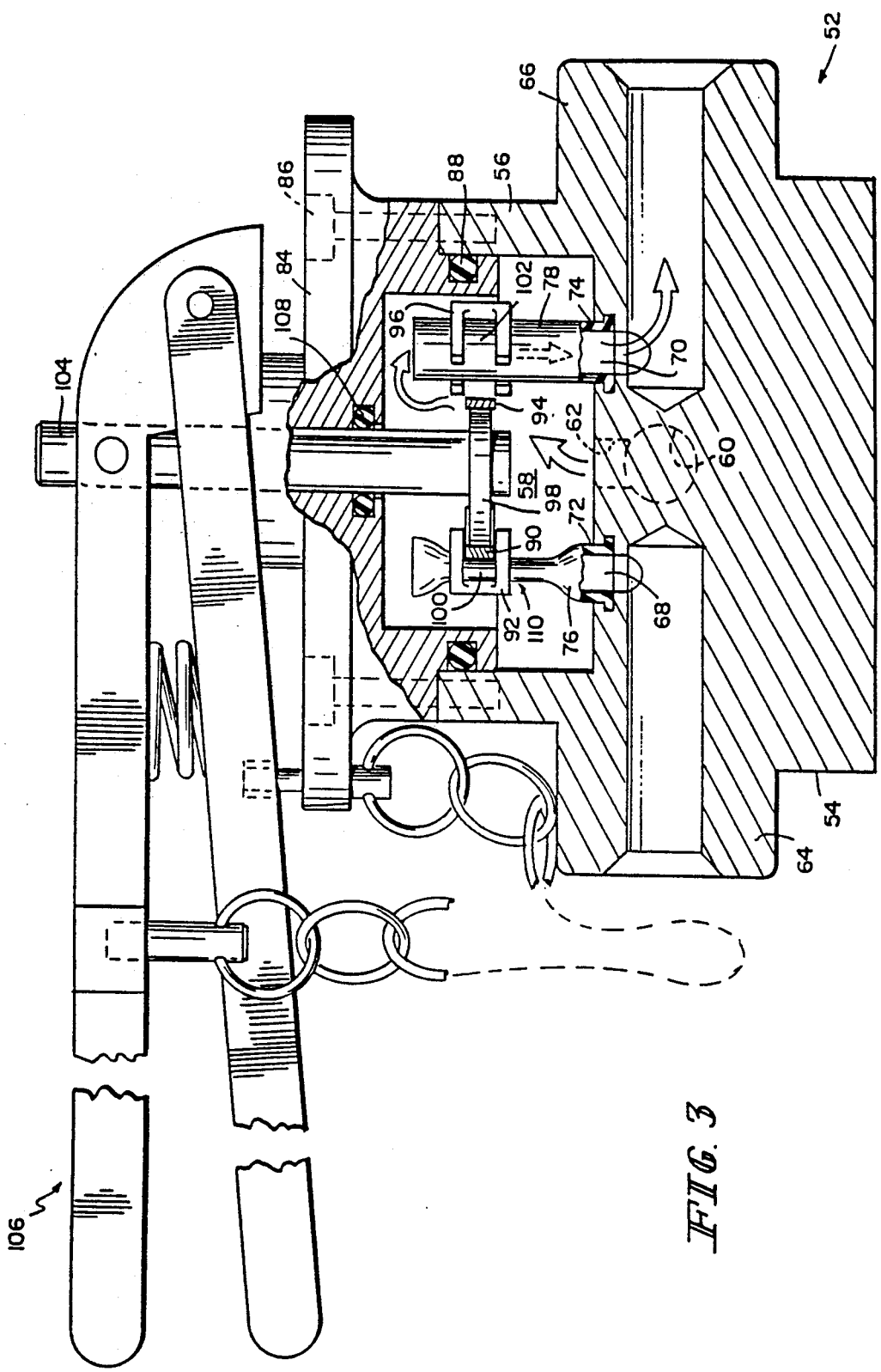
FIG. 3 shows a side view, in partial cross-section, of the embodiment of the valve of FIG. 2, taken along line 3—3 of FIG. 2.

FIG. 2 shows a top view (with top cover removed) of valve 52 which is constructed in accordance with the invention of U.S. Pat. No. 4,884,595. FIG. 3 shows a side view, in partial cross-section, of this same valve with top cover and operating handle in place. Valve 52 includes a valve body 54 having side walls 56 which define a fluid holding valve chamber 58. A single inlet 60 is provided for connecting fluid holding chamber 58 to an upstream source of pressurized fluid. Inlet 60 has a downstream end 62 which opens into chamber 58.

Valve 52 is further provided with outlets 64 and 66 which are adapted for connection to downstream devices. With reference to FIG. 3, outlets 64 and 66 have upstream ends 68 and 70 which open into chamber 58 and which are sealingly connected to first ends 72 and 74, respectively, of collapsible tubing lengths 76 and 78. Tubing lengths 76 and 78 extend from openings 68 and 70 into valve chamber 58 which is defined by side walls 56 and cover 84 of valve body 54. Cover 84 is attached to side walls 56 by bolts 86, and a seal is effected between side walls 56 and cover 84 by O-ring 88.

Referring to FIGS. 2 and 3, a pair of pivotally mounted closure members 90, 92 and 94, 96 are provided on opposing sides of tubing lengths 76 and 78, respectively. Closure members 90, 92 and 94, 96 are operated by camming device 98 to collapse tubing lengths 76 and 78 at locations 100 and 102 (FIG. 3), either individually or simultaneously (i.e., simultaneously collapsed or uncollapsed), as desired. For purposes of illustration only, tubing length 76 is shown in the collapsed state, while tubing length 78 is shown in the uncollapsed state. As illustrated in FIG. 3, cam 98 is controlled by a shaft 104 and handle 106 mechanism. Shaft 104 extends through cover 84 and is sealed appropriately by O-ring 108.

Referring again to FIG. 3, when tubing length 76 is collapsed at location 100 by the action of cam 98 and closure members 92, 90, the pressure of the fluid within chamber 58 further collapses that portion of tubing length 76 between location 100 and outlet opening 68, which portion is generally indicated by reference numeral 110. Tubing lengths 76 and 78 (and portion 110) can be as long as necessary to provide for an effective and total shut-off of the outlets by the action of cam 98 and the fluid pressure on portion 110 of the collapsible tubing. This arrangement prevents valve leakage or valve clogging, notwithstanding the presence of various types and sizes of contaminants in the fluid flow which is controlled by the valve.

Figure 4:
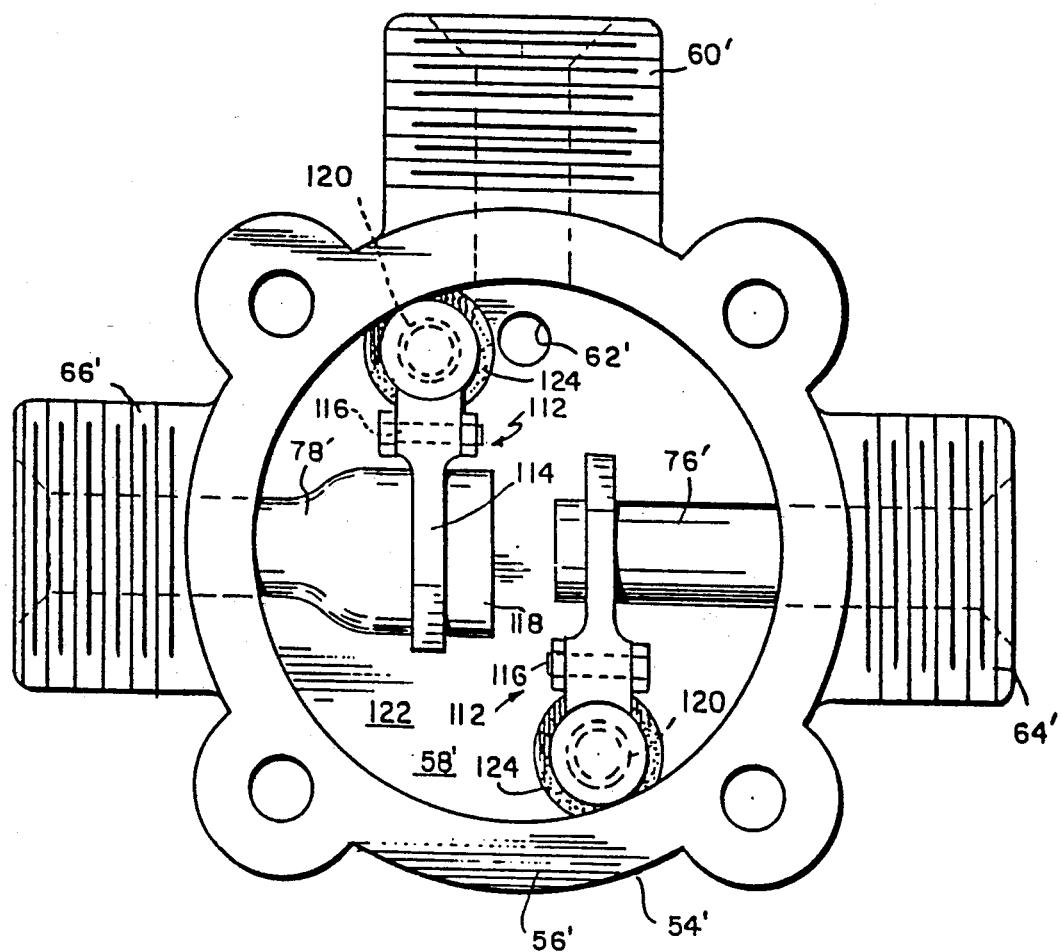
FIG. 4 shows a top view (with top cover removed) of an alternative embodiment of a valve constructed in accordance with the invention of U.S. Pat. No. 4,884,595.

FIG. 4 shows a top view of an alternative embodiment of the valve of FIGS. 2 and 3. For ease of reference, substantially identical structures in FIGS. 2 and 4 are identified by like reference numerals, with the addition of a prime designation to the numerals of FIG. 4.

Figure 5:
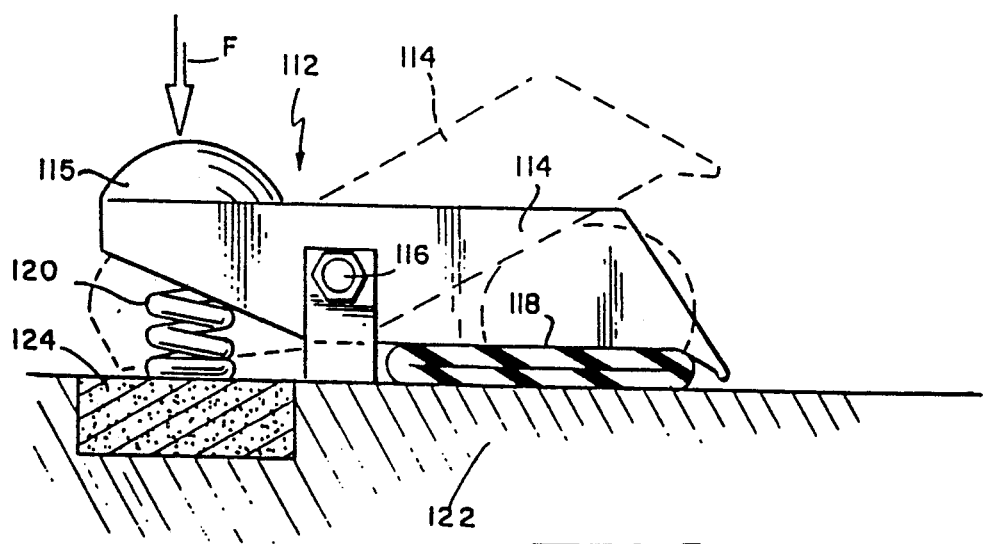
FIG. 5 shows a close-up view of a portion of the alternative embodiment shown in FIG. 4.

The primary distinctions between the embodiment of FIG. 4 and that of FIGS. 2 and 3 is the mechanism 112 used in the embodiment of FIG. 4 to collapse collapsible tubing lengths 76' and 78'. Mechanism 112 is schematically illustrated in FIG. 5. Mechanism 112 comprises an arm 114 which is pivotally mounted near its center point at 116. On one side of pivot 116, arm 114 extends over and adjacent the collapsible tubing, which is identified by reference numeral 118 in FIG. 5. On the Other side of pivot 116, the other end 115 of arm 114 is biased upwardly by the action of a biasing member which, in this embodiment, comprises coil spring 120. The action of spring 120 urges arm 114 in a clockwise direction around pivot 116 which will cause the collapse of tubing 118 by squeezing the tubing between arm 114 and underlying support 122. When tubing 118 is collapsed, the associated outlet of the valve is considered "closed." To open the valve, a force F is applied as indicated to the portion of arm 114 immediately above spring 120 (i.e., end 115 of arm 114), compressing the spring and raising the portion of arm 114 which lies adjacent tubing 118. When arm 114 is raised, the pressure of the fluid within chamber 58' causes tube 118 to return to the uncollapsed state, thus opening the associated outlet of the valve.

An additional feature of the embodiment illustrated in FIGS. 4 and 5 (which may also be incorporated in other embodiments of the invention of U.S. Pat. No. 4,884,595) relates to an arrangement which will allow the outlets of the valve to be opened "automatically" in the event the temperature of the valve increases beyond a selected, predetermined value. This arrangement is especially well-suited for applications in which the valve is to be used in a fire warning or fire control system. It involves the use of a block of low temperature melting point metal 124 as a supporting base for spring 120. If, for instance, the location of the valve is engulfed in flames and the valve cannot be manually, electrically, or otherwise activated, an increase in the temperature of valve body 54' will cause metal base 124 to soften and melt, allowing spring 120 to sink into base 124 causing tubing 118 to revert to the uncollapsed state.

The particular material used for base 124 can be selected so as to allow for such "automatic" operation to occur when the temperature of the valve body reaches or exceeds a predetermined value. This particular aspect of the invention is not intended to be limited to the particular configuration of components illustrated in FIG. 5, but can be incorporated into other embodiments, as well. A similar feature could, for example, be incorporated into the embodiment shown in FIGS. 2 and 3 above, or in alternative configurations. However, the arrangement shown in FIG. 5, and particularly the use of a low melting point metal to "trigger" the automatic operation of the valve, are preferred features of the invention of U.S. Pat. No. 4,884,595 and are thought to offer advantages over other possible designs.

It should be noted that Force F may be generated by mechanical, electrical, hydraulic, or other means. The terms "fluid" or "fluids" and "medium" or "media" are used interchangeably in this application to refer to the material(s) (in gaseous, liquid or solid form) which constitute a flow to be controlled by a device which incorporates the invention of U.S. Pat. No. 4,884,595.

Figure 6:
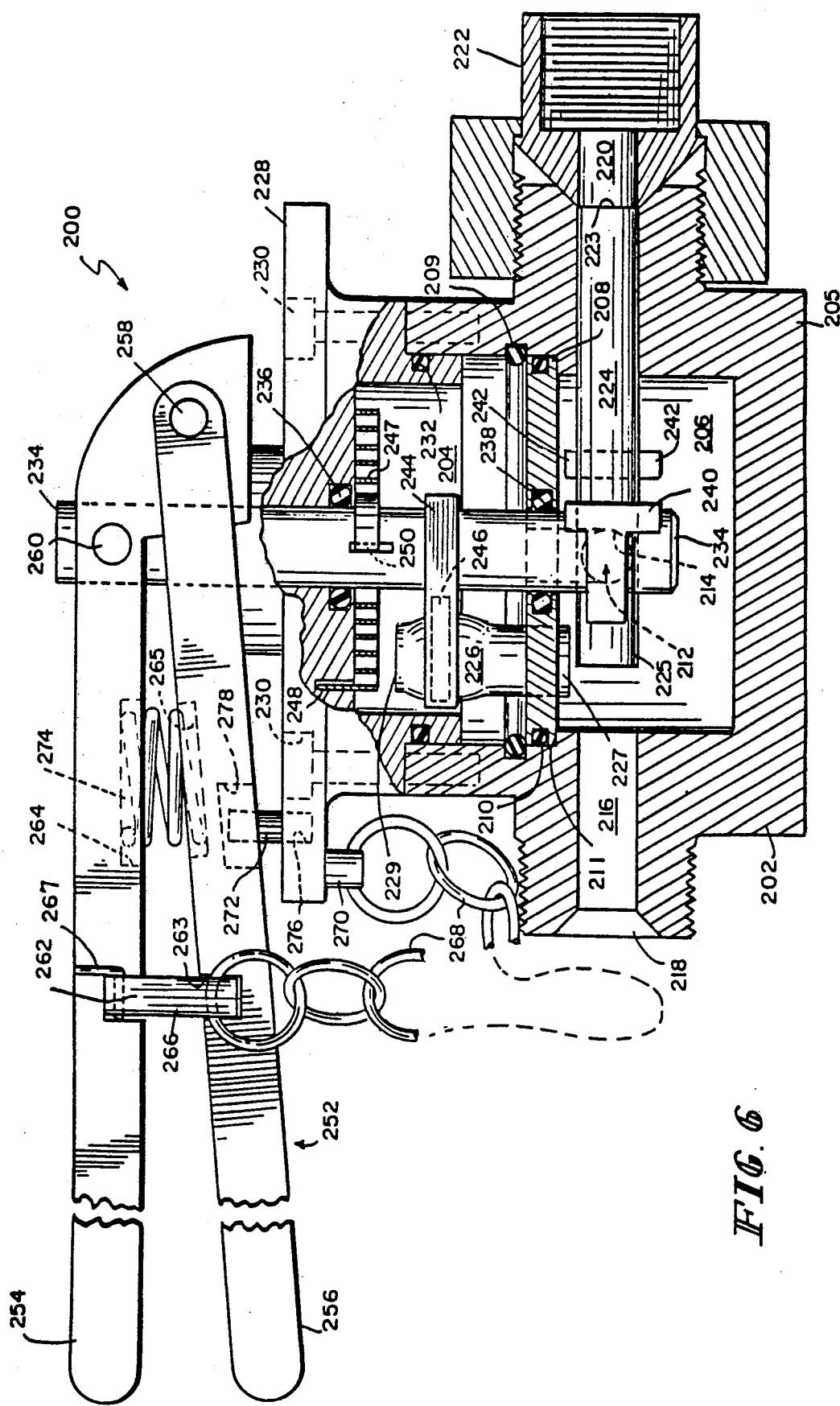
FIG. 6 is a side perspective view, partially broken away, of an embodiment of the invention of U.S. Ser. No. 427,255 which has an improved means for automatically opening the valve when the temperature to which the valve is exposed reaches or exceeds a predetermined value.

Referring to FIG. 6, another embodiment of a valve which makes use of the principles of the invention of U.S. Pat. No. 4,884,595 is shown. This embodiment, which is the subject of U.S. Ser. No. 427,255, includes an improved arrangement for opening the valve "automatically" in the event the temperature of the valve increases beyond a selected, predetermined temperature. Valve 200 has a valve body 202 and a cover 228 secured to the valve body 202. A plate 208 mounted within valve body 202 separates an upper valve chamber 204 in valve body 202 from a lower valve chamber 206 in valve body 202. A retaining ring 209 holds plate 208 in place against an annular shoulder 211 formed in an inner sidewall of valve body 202. Retaining ring 209 is illustratively a monel spring steel retaining ring. An O-ring 210 extends around the perimeter of plate 208 to seal plate 208 to the inner sidewall of valve body 202. Cover 228 is secured to valve body 202 by bolts 230. An O-ring 232 is provided to effect a seal between cover 228 and the inner sidewall of the valve body 202.

A lower portion 205 of valve body 202 has an inlet port 212 opening to an inlet passage 214 which extends upwardly into the upper valve chamber 204 and opens therein. Inlet port 212 is coupled to an upstream source of pressurized fluid (not shown).

Lower portion 205 of valve body 202 also has a first outlet port 218 which is coupled to downstream devices such as sprinkler heads, plumbing fixtures, wash down hoses, or other manually or automatically operated valves. An outlet passageway 216 connects outlet port 218 to lower valve chamber 206.

Lower portion 205 of valve body 202 also has a second outlet port 222 which is coupled to a drain (not shown). A second outlet passageway 220 connects outlet port 222 to a downstream end 223 of a length of collapsible tubing 224. An upstream end 225 of collapsible tubing 224 opens into lower valve chamber 206.

A second length of collapsible tubing 226 has a downstream end 227 which is received and held in plate 208 and opens into lower valve chamber 206. Collapsible tubing 226 extends upwardly from plate 208 into upper valve chamber 204 and has an upstream end 229 which opens into upper valve chamber 204.

Valve 200 also has a shaft 234. Shaft 234 extends downwardly through the center of valve body 202 from above cover 228 through upper valve chamber 204 and into lower valve chamber 206. An O-ring 236 provides a seal between shaft 234 and cover 228. An O-ring 238 provides a seal between shaft 234 and plate 208.

Shaft 234 has at its lower end a first closure member 240 mounted thereon adjacent collapsible tubing 224. Illustratively, first closure member 240 is a rod which extends axially along an outer surface of shaft 234. A first closure stop 242 is mounted in lower valve chamber 206 adjacent collapsible tubing 224 on the opposite side of collapsible tubing 224 from first closure member 240. Shaft 234 rotates to move first closure member 240 against and away from first closure stop 242 to selectively collapse and uncollapse collapsible tubing 224 as will be discussed in more detail below.

Shaft 234 also has a second closure member 244 mounted thereon between cover 228 and plate 208. Illustratively, first closure member 244 is a finger which extends radially from shaft 234 adjacent one side of collapsible tubing 226. A second closure stop 246 is mounted in upper valve chamber 204 adjacent collapsible tubing 226 on the opposite side of collapsible tubing 226 from second closure member 244. Shaft 234 rotates to move second closure member 244 away from and against second closure stop 246 to selectively uncollapse and collapse collapsible tubing 226 as will be explained in more detail below.

A coil spring 247 is affixed to shaft 234 immediately beneath cover 228 and is also affixed to cover 228. Illustratively, coil spring 247 is affixed to shaft 234 by a pin 250 and is affixed to cover 228 by a pin 248. Coil spring 246 is illustratively a torque wound monel spring. Coil spring 247 rotates shaft 234 to open valve 200 in the event the temperature to which valve 200 is exposed exceeds the predetermined temperature as will be explained in more detail below.

A handle 252 is affixed to the top of shaft 234. Handle 252 has legs 254, 256 which are pivotally coupled to each other at one end thereof at pivot 258. A bolt 260 secures handle 254 to shaft 234.

Leg 254 of handle 252 has a slot 262 transversely extending through a lower portion thereof. Leg 252 has a corresponding slot 263 transversely extending through an upper portion thereof. A lock pin is received in slots 266, 263 of legs 254, 252, respectively. Lock pin 266 is secured in place by retaining wire 267. When in place, lock pin 266 prevents manual operation of valve 200 as will be explained below. A chain 268 is attached at one end to pin 266 and at its other end to a pin 270. Pin 270 is secured to one side of cover 228. Chain 268 prevents lock pin 266 from being lost or stolen when lock pin 266 is removed from slots 262, 263.

Leg 254 also includes a downwardly opening recess 264 for receiving one end of a spring 274. Leg 256 of handle 252 has an upwardly opening recess 265 beneath recess 264 of leg 254 for receiving a second end of spring 274.

Leg 256 of handle 252 has a downwardly opening recess 278 immediately above an upwardly opening recess 276 in cover 228. A positioning lock pin 272 is received in recesses 276, 278 of cover 228 and leg 256, respectively, and extends therebetween. Recess 278 is filled with a temperature sensitive material which melts when the temperature to which valve 200 is exposed reaches or exceeds a predetermined temperature. Alternatively, positioning lock pin 272 could be made from temperature sensitive material which melts when the temperature to which valve 200 is exposed reaches or exceeds a predetermined temperature.

As discussed previously, coil spring 247 rotates shaft 234 to open valve 200 when valve 200 is exposed to a temperature which reaches or exceeds a predetermined temperature. When valve 200 is assembled, spring 247 is secured to shaft 234 and cover 228. Cover 228 is then turned clockwise to set the torque for coil spring 247 and cover 228 is then secured in place. Handle 252 is then assembled to shaft 234. At this time, valve 200 will be closed as shown in FIG. 6. Positioning lock pin 272 is received in recesses 276, 278 of cover 228 and leg 256, respectively, and prevents movement of handle 252 which in turn prevents shaft 234 from rotating. Spring 274 urges legs 254, 256 of handle 252 apart to maintain positioning lock pin 272 in recesses 276, 278 of cover 228 and leg 256, respectively. Positioning lock pin 272 and recesses 276, 278 comprise a temperature sensitive link which mechanically couples the shaft 234 to the valve body 202 to prevent shaft 234 from rotating when the temperature to which valve 200 is exposed is less than the predetermined temperature and decouples the shaft 234 from the valve body 202 when the temperature to which valve 200 is exposed reaches or exceeds the predetermined temperature, thus permitting shaft 234 to rotate and open valve 200.

In the closed position of valve 200 as shown in FIG. 6, second closure member or finger 244 is forced against second closure stop 246 pinching collapsible tubing 226 shut, thus collapsing collapsible tubing 226. When collapsible tubing 226 is pinched shut, the pressure in upper valve chamber 204 acts on the portion of collapsible tubing 226 downstream of finger 244 to collapse collapsible tubing 226 in the same manner as was discussed with collapsible tubing 30 and 32 of FIG. 1. Also, when shaft 234 is in the position shown in FIG. 6, first closure member 240 will have been rotated away from first closure stop 242 so that collapsible tubing 224 is uncollapsed. Lower valve chamber 206 will thus be coupled through collapsible tubing 224, outlet passage 220 and outlet port 222 to a drain (not shown), thus relieving the pressure in lower valve chamber 206. This in turn relieves pressure on the downstream side of collapsible tubing 226 and also relieves the pressure to the downstream devices to which outlet port 218 is coupled.

Valve 200 can be opened manually or will open automatically when it is exposed to a temperature which reaches or exceeds the predetermined temperature. To open valve 200 manually, leg 256 of handle 252 is moved upwardly toward leg 254 of handle 252. This moves recess 278 of leg 256 up off of positioning lock pin 272 so that handle 252 can be rotated to open valve 200. Lock pin 266 when in place prevents manual operation of valve 200 by preventing leg 256 of handle 252 from being moved upwardly. Illustratively, cover 228 has two recesses 276 located so that positioning lock pin 272 can be moved between them to permit valve 200 to be locked by lock pin 266 in either the open or closed position.

Illustratively, valve 200 is opened by rotating handle 252 counterclockwise. When handle 252 is rotated counterclockwise, shaft 234 rotates counterclockwise. This forces first closure member 240 against first closure stop 242, pinching collapsible tubing 224 shut. It also rotates second closure member 244 away from second closure stop 246 which uncollapses collapsible tubing 226. When this occurs, pressurized fluid flows from upper valve chamber 204 through collapsible tubing 226 into lower valve chamber 206 and out through outlet passageway 216 and outlet port 218 to the downstream devices (not shown). Since first closure member 240 has been forced against first closure stop 242 to pinch collapsible tubing 224 shut, collapsible tubing 224 will be collapsed by the pressure in lower valve chamber 206 in the same manner as discussed with collapsible tubing 30 and 32 of FIG. 1.

When the temperature to which valve 200 is exposed reaches or exceeds the predetermined temperature, valve 200 will open automatically. As shown in FIG. 6, valve 200 is in the closed position wherein first closure member 240 has been rotated away from first closure stop 242 and closure member or finger 244 has been forced against second closure stop 246 so that collapsible tubing 226 is collapsed and collapsible tubing 224 is uncollapsed. When the temperature to which valve 200 is exposed reaches or exceeds the predetermined temperature, illustratively 400° Fahrenheit, the temperature sensitive material in recess 278 in which positioning lock pin 272 is received melts. This frees handle 252 for rotation, thus freeing shaft 234 for rotation. Coil spring 247 will then rotate shaft 234 and handle 252 counterclockwise. This opens valve 200 in the same manner as if valve 200 was opened manually as discussed above.

Figure 7:
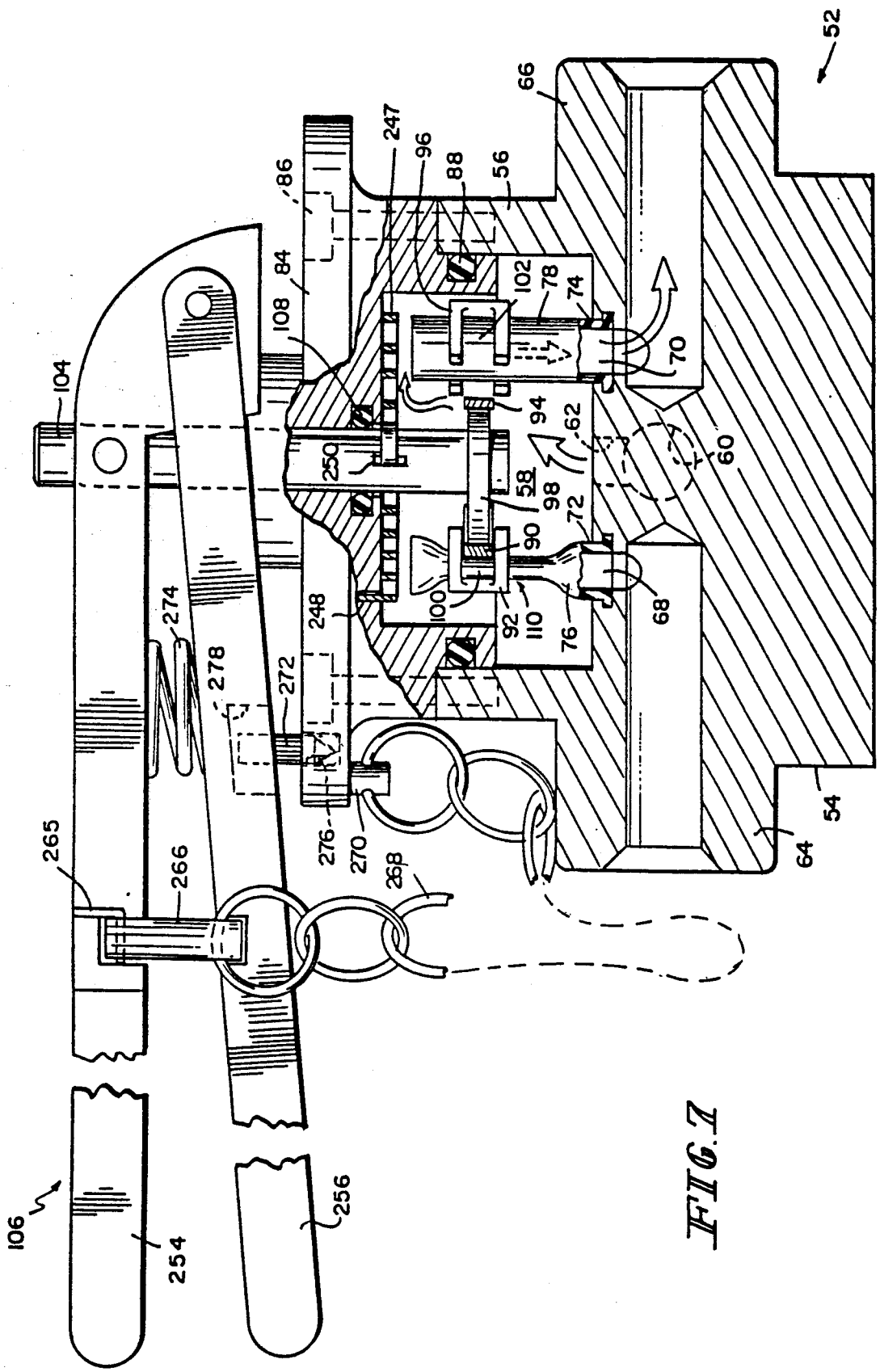
FIG. 7 is a side perspective view, partially broken away, of the embodiment of the valve of FIG. 3 modified to incorporate the improved automatic opening means of the embodiment of FIG. 6.

FIG. 7 shows a modification to the valve of FIG. 3 to incorporate the improved arrangement of FIG. 6 for "automatically" opening or shifting the valve when the temperature to which the valve is exposed reaches or exceeds a predetermined temperature. The same reference numerals used in FIGS. 3 and 6 will be used to identify like elements in FIG. 7. Further, only the modifications made to the valve of FIG. 3 to incorporate the improved automatic shifting arrangement will be discussed.

The valve of FIG. 7 is illustratively a three position valve. It has a first open position where outlet 64 is closed and outlet 66 is open, a neutral position where both outlets 64, 66 are closed, and a second open position where outlet 64 is open and outlet 66 is closed. As shown in FIG. 7, valve 52 is in its first open position. Camming device 98 has actuated closure members 90, 92 to collapse flexible tubing length 76 and has actuated closure members 94, 96 to allow flexible tubing length 78 to uncollapse.

Handle 106 is rotated, illustratively counterclockwise sixty degrees, to shift valve 52 to its neutral position. Camming device 98 will then have actuated closure members 90, 92, 94, 96 to collapse both flexible tubing lengths 76, 78.

Handle 106 is rotated an additional sixty degrees counterclockwise to shift valve 52 to its second open position. Camming device 98 will then have actuated closure members 90, 92 to uncollapse flexible tubing length 76 and will have actuated closure members 94, 96 to collapse flexible tubing length 78.

Valve 52 is provided with a coil spring 247 affixed to shaft 104 immediately beneath cover 84 which is also affixed to cover 84. Illustratively, coil spring 247 is affixed to shaft 104 by a pin 250 and is affixed to cover 228 by a pin 248.

Handle 106 also has upper and lower legs 254, 256, respectively. Positioning lock pin 272 is received in recesses 272, 278 of cover 84 and leg 256, respectively, and extends therebetween. Recess 278 is filled with a temperature sensitive material which melts when the temperature to which valve 52 is exposed reaches or exceeds a predetermined temperature. Alternatively, positioning lock pin 272 could be made from a temperature sensitive material.

Coil spring 247 "automatically" shifts valve 52 to its second open position when the temperature to which valve 52 is exposed reaches or exceeds the predetermined level. As discussed previously with respect to FIG. 6, when the predetermined temperature is reached, the temperature sensitive material in recess 278 melts. This releases positioning lock pin 272 freeing handle 106 for rotation. Coil spring 247 then rotates shaft 104 counterclockwise to shift valve 52 to its second open position.

Figure 8:
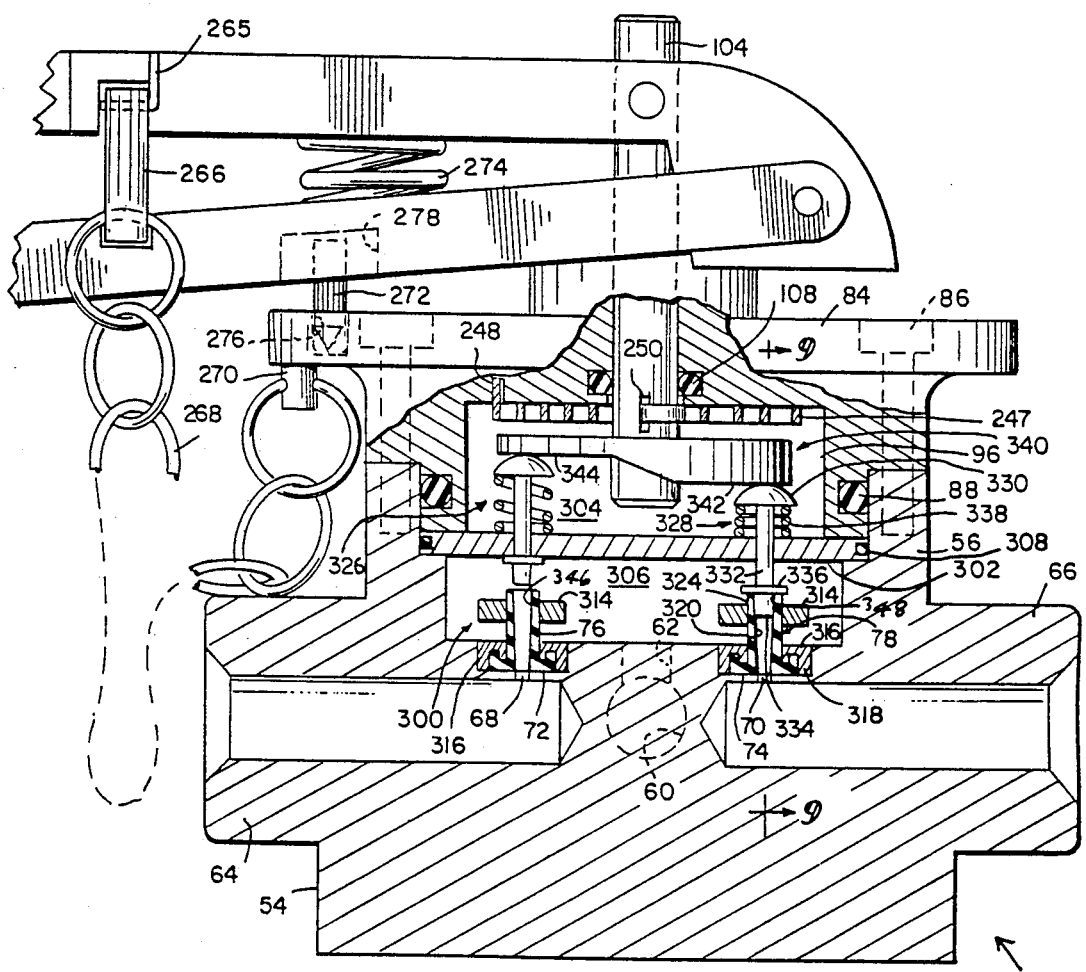
FIG. 8 is a side perspective view, partially broken away, of an embodiment of this invention for an improved mechanism for selectively collapsing and uncollapsing the collapsible tubing.

FIG. 8 shows an improved mechanism 300 for selectively collapsing and uncollapsing the collapsible tubing which can replace such mechanisms in the valves of FIGS. 3, 6, and 7. The improved mechanism 300 will be described in the context of a modification to the valve of FIG. 7. For ease of reference, substantially identical structures in FIGS. 7 and 8 are identified by like reference numbers. Further, only the modifications made to the valve of FIG. 7 to incorporate the improved mechanism 300 will be discussed.

Valve 52 has a valve body 54 having sidewalls 56 and a cover 84. A plate 302 mounted within valve body 54 separates an upper chamber 304 from a lower valve chamber 306 in valve body 54. An O-ring 308 extends around the perimeter of plate 302 to seal plate 302 to the sidewalls 56 of valve body 54. Inlet port 60 in valve body 54 couples lower valve chamber 306 to an upstream source of pressurized fluid. Inlet 60 has a downstream end 62 which opens into lower valve chamber 306.

Valve 300 has outlets 64, 66 which are adapted for connection to downstream devices. Outlets 64, 66 have upstream ends 68, 70, respectively, which open into lower valve chamber 306 and which are sealing connected to first or lower ends 72, 74, respectively, of collapsible tubings 76, 78. Collapsible tubings 76, 78 extend from openings 68, 70, into lower valve chamber 306.

Figure 9:
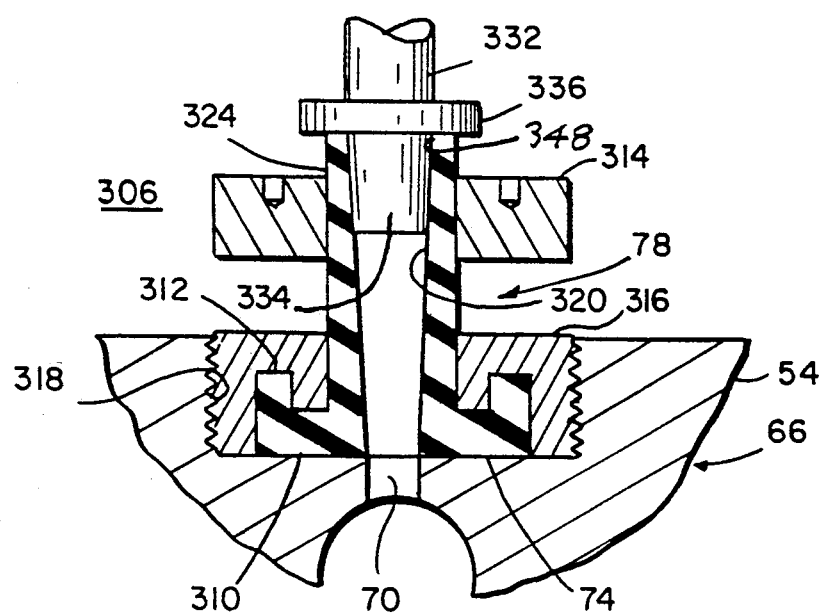
FIG. 9 is a section view of a broken away section taken along the line 9—9 of FIG. 8.

As best seen in FIG. 9 with reference to collapsible tubing 78, collapsible tubing 78 is illustratively a molded rubber piece. Lower end 74 of collapsible tubing 78 has an annular flange 310 extending radially therefrom which has an upwardly projecting lip 312 in spaced relation to the outer surface of collapsible tubing 78.

Collapsible tubings 76, 78 are held in place in valve 52 by respective sets of retaining rings 314, 316. Again referring to FIG. 9 with reference to collapsible tubing 78, valve body 54 has a recess 318 at the bottom of lower valve chamber 306 into which the upstream end 70 of outlet 66 opens. The lower end 74 of collapsible tubing 78 is received in recess 318 so that upstream end 70 of outlet 66 opens into a bore 320 of collapsible tubing 78. Retaining ring 316, which is illustratively a brass retaining ring, is inserted around collapsible tubing 78 into recess 318. Retaining ring 316 is formed to mate with the annular flange 310 with upwardly projecting lip 312 of the lower portion 74 of collapsible tubing 78. Retaining ring 316 and recess 318 are illustratively threaded so that retaining ring 316 is threaded into recess 318 and holds collapsible tubing 78 in place. Retaining ring 314, which is also illustratively made of brass, is mounted in valve chamber 306 in conventional fashion and surrounds an upper end 324 of collapsible tubing 78 to hold it in place. A second set of retaining rings 314, 316 hold collapsible tubing 76 in place in the same fashion as just described.

Referring to FIG. 8, mechanism 300 also includes pistons 326, 328 mounted in plate 302 above collapsible tubing 76, 78, respectively. Pistons 326, 328, are identical so only piston 328 will be described. Piston 328 has a head 330 from which a shaft 332 extends downwardly through plate 302. Shaft 332 has a tapered distal end 334 and an annular flange 336 around it in spaced relation to distal end 334. A spring 338 is disposed between head 330 of piston 328 and plate 302 around shaft 332 of piston 328. Spring 338 biases piston 328 upwardly and flange 336 limits the upward movement of piston 328.

Mechanism 300 also includes a camming device 340 mounted on shaft 104 at a lower end thereof. Camming device 340 illustratively comprises a disc having a downwardly projecting actuating section 342 and a recessed section 344.

In operation, when shaft 104 is turned, downwardly projecting actuating section 342 of camming device 340 will contact the head 330 of one of pistons 326, 328, and force that piston downwardly so that the tapered end 334 of that piston is forced into an inlet 346, 348 of the respective collapsible tubing 76, 78. For example, as shown in FIGS. 8 and 9, downwardly projecting actuating section 342 of camming device 340 has contacted head 330 of piston 328 and forced piston 328 downwardly. This forces tapered end 334 of piston 328 into the inlet 348 of collapsible tubing 78. The pressure differential between lower valve chamber 306 and the bore 320 of collapsible tubing 78 causes collapsible tubing 78 to collapse around tapered end 334 of piston 328 shutting off outlet 66 from the fluid in chamber 306. However, since collapsible tubing 78 collapses around tapered end 334 of piston 328, it is not completely pinched together and thus does not take on a set "pinched shut" shape if maintained in the collapsed condition for a long period of time.

Outlet 66 is opened to the fluid in chamber 306 when shaft 104 is rotated so that the recessed portion 344 of camming device 340 is above head 330 of piston 328. When this occurs, spring 338 forces piston 328 upwardly which draws tapered end 334 of piston 328 out of the inlet 340 of collapsible tubing 78. Immediately upon this happening, since collapsible tubing 78 was never completely "pinched shut," its bore 320 is open. Fluid can immediately flow from lower valve chamber 306 through bore 320 in collapsible tubing 78 to outlet 66. Illustratively, bore 320 is tapered to conform to tapered end 334 of piston 328. Piston 326 collapses and uncollapses collapsible tubing 76 in the same manner. Collapsible tubing 76 is shown in the open or uncollapsed condition in FIG. 8.

From the preceding description of the preferred embodiments, it is evident that the objects of the invention are attained. Although the invention has been described and illustrated in detail, it is to be clearly understood that the same is intended by way of illustration and example only and is not to be taken by way of limitation. The spirit and scope of the invention are to be limited only by the terms of the appended claims.

What is claimed is:

1. A flow control device, comprising:
   a body having sidewalls which define a fluid-holding chamber;
   inlet means opening into the chamber for supplying a fluid flow into the chamber under a positive pressure;
   outlet means opening into the chamber and including an outlet opening in the body;
   a collapsible tubing having one end sealingly attached to the outlet opening and an opposite end extending into the chamber, said opposite end having an inlet; and
   means for selectively blocking and unblocking the inlet of the opposite end of the collapsible tubing to block and unblock fluid flow from the chamber through the outlet means wherein blocking the inlet of the collapsible tubing causes a decrease in pressure in the collapsible tubing downstream of the inlet which causes the fluid pressure in the chamber to collapse a portion of the collapsible tubing in the chamber downstream of the inlet, the collapse of the collapsible tubing cooperating in conjunction with the blocking and unblocking means to further block fluid flow from the chamber through the outlet means.

2. The flow control device of claim 1 wherein the means for selectively blocking and unblocking the inlet of the opposite end of the collapsible tubing includes means for insertion into the inlet of the opposite end of the collapsible tubing to block it when inserted and cause the collapsible tubing to collapse around the insertion means, and means for inserting and withdrawing the insertion means into and from the inlet of the opposite end of the collapsible tubing.

3. The flow control device of claim 2 wherein the insertion means comprises a piston and the means for selectively blocking and unblocking the inlet of the opposite side of the collapsible tube includes means for moveably mounting the piston in the chamber.

4. The flow control device of claim 3 wherein the inserting and withdrawing means comprises a cam for biasing the piston into the inlet of the opposite end of the collapsible tubing when in a first position and means for biasing the piston out of the inlet of the opposite end of the collapsible tubing when the cam is in a second position.

5. The flow control device of claim 4 wherein the means for biasing the piston out of the inlet of the opposite end of the collapsible tubing when the cam is in the second position comprises a spring.

6. The flow control device of claim 3 wherein the piston is tapered and the collapsible tubing has a tapered bore extending therethrough which conforms with the tapered piston when the piston is inserted in the inlet of the opposite end of the collapsible tubing.

7. The flow control device of claim 3 and further comprising means responsive to an increase in temperature for automatically causing the inserting and withdrawing means to withdraw the insertion means from the inlet of the opposite end of the collapsible tubing to allow fluid flow from the chamber through the outlet means when the temperature of the flow control device increases beyond a predetermined value.

8. The flow control device of claim 2 wherein the insertion means prevents the collapsible tubing from being completely pinched shut when it is inserted in the collapsible tubing.

9. A flow control device, comprising:
   a body having sidewalls which define a fluid-holding chamber;
   inlet means opening into the chamber for supplying a fluid flow into the chamber under a positive pressure;
   a plurality of outlet means opening into the chamber, each outlet means having an outlet opening in the body;
   a plurality of collapsible tubings, each collapsible tubing having a first end sealingly attached to the body around one of the outlet openings;
   each collapsible tubing having an opposite end extending into the chamber, the opposite end having an inlet;
   means associated with each collapsible tubing for insertion into the inlet of that collapsible tubing to block the inlet to cause a decrease in pressure in that collapsible tubing wherein the fluid pressure in the chamber causes a portion of that collapsible tubing downstream of its inlet to collapse around the insertion means; and means for inserting and withdrawing each insertion means into and from the inlet of its collapsible tubing to selectively block and unblock fluid flow from the chamber through the outlet means whose outlet opening the first end of that collapsible tubing is sealingly attached wherein the collapse of each collapsible tubing around its associated insertion means inserted therein cooperates with that insertion means to block fluid flow from the chamber through the outlet means to which that collapsible tubing is sealingly attached to the associated outlet opening thereof.

10. The flow control device of claim 9 wherein each insertion means comprises a piston moveably mounted in the chamber and the inserting and withdrawing means comprises means for selectively biasing each piston into the inlet of its associated collapsible tubing and withdrawing it therefrom.

11. The flow control device of claim 10 wherein the means for selectively biasing each piston into the inlet of its associated collapsible tubing and withdrawing it therefrom comprises a spring for each piston which biases it out of the inlet of its associated collapsible tubing and a cam which depending upon its position biases the piston into the inlet of its associated collapsible tubing or allows the spring for that piston to bias it out of the inlet of its associated collapsible tubing.

12. The flow control device of claim 10 wherein each piston is tapered and each collapsible tubing has a tapered bore corresponding to the tapered piston.

13. The flow control device of claim 10 and further comprising means responsive to an increase in temperature for automatically causing the inserting and withdrawing means to withdraw at least one piston from the inlet of its associated collapsible tubing to allow fluid flow from the chamber through the outlet means whose outlet opening the first end of that collapsible tubing is sealingly attached when the temperature of the flow control device increases beyond a predetermined value.

14. The flow control device of claim 9 wherein the insertion means prevent the collapsible tubings from being completely pinched shut when they are inserted in the collapsible tubings.

15. A flow control device, comprising:
a valve having a valve body with a fluid-holding chamber therein;
inlet means opening into the chamber for supplying a fluid flow into the chamber under a positive pressure;
outlet means opening into the chamber and having an outlet opening in the body;
a collapsible tubing having one end sealingly attached to the outlet opening and an opposite end extending into the chamber, the opposite end having an inlet;
a piston moveably mounted in the chamber in spaced relation to the inlet of the collapsible tubing for insertion into and withdrawal from the inlet;
a shaft having a cam mounted thereon having a first position where it biases the piston into the inlet of the collapsible tubing to block fluid flow from the chamber through the outlet means wherein insertion of the piston into the collapsible tubing causes a pressure decrease in the collapsible tubing downstream of the inlet wherein the fluid pressure in the fluid chamber causes a portion of the collapsible tubing downstream of its inlet to collapse around the piston, the collapse of the collapsible tubing around the piston cooperating in conjunction with the piston to block fluid flow from the chamber through the outlet means, the cam having a second position where it permits the piston to be biased out of the inlet of the collapsible tubing by bias means for biasing the piton out of the inlet to unblock fluid flow from the chamber through the outlet means;
second bias means for rotating the shaft from a first position to a second position to rotate the cam from its first position to its second position;
a temperature sensitive link mechanically coupling the shaft to the body to prevent the shaft from rotating when the temperature to which the flow control device is exposed is less than a predetermined temperature, the link decoupling the shaft and body when the temperature to which the flow control device is exposed reaches or exceeds the predetermined temperature which permits the shaft to be rotated by the second biasing means to its second position to pen the valve by permitting the collapsible tubing to uncollapse.

16. The flow control device of claim 15 and further including a handle attached to the shaft for manually rotating the shaft between its first and second position to manually open and close the valve; the temperature sensitive link including the handle having a recess opening toward the valve body, the valve body having a recess opening toward the handle, and a pin received in the recesses in the handle and valve body to prevent the handle from rotating to prevent the shaft from rotating.

17. The flow control device of claim 16 wherein the handle has first and second legs pivotally coupled at one end, one leg being adjacent the valve body and interposed between the valve body and the other leg, the leg adjacent the valve body having the recess of the handle which receives the pin of the temperature sensitive link, and a spring disposed between the first and second legs of the handle to urge them apart which urges the recess in the leg adjacent the valve body onto and over the pin.

18. The flow control device of claim 16 wherein one of said recesses includes temperature sensitive material for holding said pin in place, the temperature sensitive material melting when the temperature to which it is exposed reaches or exceeds the predetermine temperature thereby releasing the pin to allow the shaft to rotate.

19. The flow control device of claim 16 wherein the pin of the temperature sensitive link is formed from temperature sensitive material, the temperature sensitive material melting when the temperature to which it is exposed reaches or exceeds the predetermined temperature thereby allowing the shaft to rotate.

20. The flow control device of claim 15 wherein the biasing means comprises a coil spring coupled to the shaft and to the valve.

21. The flow control device of claim 15 wherein the piston prevents the collapsible tubing from being completely pinched shut when it is inserted in the collapsible tubing.

22. A flow control device, comprising:
a valve having a valve body which has a fluid-holding chamber therein;
inlet means opening into the chamber for supplying a fluid flow into the chamber under a positive pressure;
first and second outlet means opening into the chamber and each including an outlet opening in the body;

first and second collapsible tubings having first ends sealingly attached to the outlet openings of the first and second outlet means, respectively, each collapsible tubing having an opposite end having an inlet;

first and second pistons moveably mounted in the valve body for insertion into and withdrawal from the inlets of the first and second collapsible tubings, respectively; and a shaft extending into the valve body and having a cam mounted thereon within the valve body, the cam having a first position for biasing the first piston into the inlet of the first collapsible tubing to block fluid flow from the chamber through the first outlet means wherein insertion of the first piston into the first collapsible tubing causes a pressure decrease in the first collapsible tubing downstream of its inlet wherein the fluid pressure in the chamber causes the first collapsible tubing to collapse around the first piston, the collapse of the first collapsible tubing around the first piston cooperating in conjunction with the first piston to block fluid flow from the chamber through the first outlet means, the cam when in its first position also allowing the second piston to be biased out of the inlet of the second collapsible tubing by means for biasing the second piston out of the inlet of the second collapsible tubing to unblock fluid flow from the chamber through the second outlet means, the cam having a second position where it biases the second piston into the inlet of the second collapsible tubing to block fluid flow from the chamber through the second outlet means wherein insertion of the second piston in the second collapsible tubing causes a pressure decrease in the second collapsible tubing downstream of its inlet wherein the fluid pressure in the chamber causes the second collapsible tubing to collapse around the second piston, the collapse of the second collapsible tubing around the second piston cooperating in conjunction with the second piston to block fluid flow from the chamber through the second outlet means, the cam when in its second position also allowing the first piston to be biased out of the inlet of the first collapsible tubing by means for biasing the first piston out of the inlet of the first collapsible tubing to unblock fluid flow from the chamber through the first outlet means.

23. The flow control device of claim 22 wherein the first and second pistons are tapered and the first and second collapsible tubings have tapered bores corresponding to the first and second tapered pistons.

24. The flow control device of claim 22 wherein the first and second pistons prevent the collapsible tubings from being completely pinched shut when they are inserted in the collapsible tubings.

25. A flow control device, comprising:

a valve having a valve body which has a fluid-holding chamber therein;

inlet means opening into the chamber for supplying a fluid flow into the chamber under a positive pressure;

first and second outlet means opening into the chamber and each including an outlet opening in the body;

first and second collapsible tubings having first ends sealingly attached to the outlet openings of the first and second outlet means, respectively, each collapsible tubing having an opposite end having an inlet;

first and second pistons moveably mounted in the valve body for insertion into and withdrawal from the inlets of the first and second collapsible tubings, respectively;

a shaft extending into the valve body and having a cam mounted thereon within the valve body, the cam having a first position for biasing the first piston into the inlet of the first collapsible tubing to block fluid flow from the chamber through the first collapsible tubing wherein insertion of the first piston into the first collapsible tubing causes a pressure decrease in the first collapsible tubing downstream of its inlet wherein the fluid pressure in the chamber causes a portion of the first collapsible tubing in the chamber downstream of the inlet of the first collapsible tubing to collapse around the first piston, the collapse of the first collapsible tubing around the first piston cooperating in conjunction with the first piston to block fluid flow from the chamber through the first outlet means, the cam when in its first position also allowing the second piston to be biased out of the inlet of the second collapsible tubing by means for biasing the second piston out of the inlet of the second collapsible tubing to unblock fluid flow from the chamber through the second outlet means, the cam having a second position where it biases the second piston into the inlet of the second collapsible tubing to block fluid flow from the chamber through the second outlet means wherein insertion of the second piston into the second collapsible tubing causes a pressure decrease in the second collapsible tubing downstream of its inlet wherein the fluid pressure in the chamber causes a portion of the second collapsible tubing in the chamber downstream of the inlet of the second collapsible tubing to collapse around the second piston, the collapse of the second collapsible tubing around the second piston cooperating in conjunction with the second piston to block fluid flow from the chamber through the second outlet means, the cam when in its second position allowing the first piston to be biased out of the inlet of the first collapsible tubing by means for biasing the first piston out of the inlet of the first collapsible tubing to unblock fluid flow from the chamber through the first outlet means;

a spring coupled to the shaft and to the valve body to rotate the shaft to rotate the cam from its first position to its second position; and a fusible link coupled to the shaft and to the valve body for preventing the shaft from rotating from its first position, the fusible link melting when the temperature to which the valve is exposed reaches or exceeds a predetermined temperature which releases the shaft for rotation wherein the spring rotates the shaft to rotate the cam from its first position to its second position to open the valve.

26. The flow control device of claim 25 and further including a handle coupled to the shaft to permit the shaft to be manually rotated between its first and second position to permit the valve to be manually opened and closed.

27. The flow control device of claim 25 wherein the spring comprises a coil spring.

28. The flow control device of claim 26 wherein the handle has a recess opening toward the valve body and the valve body having a recess opening toward the handle, the valve further including a pin received in the recesses for preventing the handle from rotating to prevent the shaft from rotating.

29. The flow control device of claim 28 wherein the fusible link includes one of said recesses having temperature sensitive material therein for securing the pin in place, the temperature sensitive material melting when the temperature to which it is exposed reaches or exceeds the predetermined temperature thereby releasing the pin to allow the shaft to rotate.

30. The flow control device of claim 28 wherein the fusible link comprises the pin being formed from temperature sensitive material which melts when exposed to a temperature which reaches or exceeds the predetermined temperature to allow the shaft to rotate.

31. The flow control device of claim 25 wherein the first and second pistons prevent the collapsible tubings from being completely pinched shut when they are inserted in the collapsible tubings.

* * * * *